United States Patent [19]
Gent et al.

[11] Patent Number: 5,267,502
[45] Date of Patent: Dec. 7, 1993

[54] WEAPONS SYSTEMS FUTURE MUZZLE VELOCITY NEURAL NETWORK

[75] Inventors: Christopher R. Gent, Crowthorne; Steven A. Bryant, Camberley, both of England

[73] Assignee: SD-Scicon UK Limited, England

[21] Appl. No.: 880,454

[22] Filed: May 8, 1992

[30] Foreign Application Priority Data

May 8, 1991 [GB] United Kingdom ............... 9109954
Jun. 13, 1991 [GB] United Kingdom ............... 9112793

[51] Int. Cl.⁵ ............................................. F41G 3/14
[52] U.S. Cl. .................................. 89/41.03; 395/22
[58] Field of Search ....................... 89/41.03; 395/22

[56] References Cited

U.S. PATENT DOCUMENTS

| | | | |
|---|---|---|---|
| 3,538,318 | 11/1970 | Clutterbuck et al. | 364/551.01 |
| 3,848,509 | 11/1974 | Corn | 89/41.22 |
| 4,457,206 | 7/1984 | Toulios et al. | 89/14.05 |
| 4,914,604 | 4/1990 | Castelaz | 235/411 |

FOREIGN PATENT DOCUMENTS 2094950 9/1982 United Kingdom .

OTHER PUBLICATIONS

Castelaz, Patrick F., "Neual Networks in Defense Applications" IEEE Conference on Neural Networks, Jul. 24-27, 1988, pp. II-473 to II-480.

Drüner, W. and Wegener, K. H., "Adaptive Control for Tank-Gun Stabilization," *Scientific Honeyweller*, 10(1989)Winter, No. 1, pp. 168-175.

*Primary Examiner*—Stephen C. Bentley
*Attorney, Agent, or Firm*—Cesari and McKenna

[57] ABSTRACT

In a device and method for predicting a future muzzle velocity of an indirect fire weapon 3, 7 means 9, 11 responsive to a measurement of muzzle velocity are adapted to implement an adaptive empirical prediction method to predict the future muzzle velocity. The invention also relates to an aiming system and method for an indirect-fire weapon 3, 7. The system comprises a muzzle velocity measuring device 5, and predictor means 9, 11 responsive to an output of the muzzle velocity measuring device 5 for determining a new elevation setting from the weapon. Preferably, the predictor means utilizes an adaptive empirical prediction method such as a Kalman Filter or neural network.

30 Claims, 4 Drawing Sheets

WEAPONS SYSTEMS FUTURE MUZZLE VELOCITY NEURAL NETWORK

BACKGROUND OF THE INVENTION

In general, the present invention relates to improvements in weapons systems and in particular to devices and methods for predicting parameters useful for determining the aim of projectiles. It is especially, although not exclusively, suited to applications concerning the aiming of a shell fired from a gun. The invention extends to prediction and aiming methods and devices per se and to weapons systems incorporating such devices. One important aspect of the invention entails prediction of muzzle velocity.

The accuracy of indirect-fire weapons is dependent on a multitude of factors. For a long time, one major cause of inaccuracy has been unpredictable variation in muzzle velocity. Ideally, ignoring environmental factors such as wind, for a given combination of barrel type, charge and projectile, the muzzle velocity would be substantially constant. However, in reality it varies in dependence on a number of effects, such as barrel temperature, barrel wear and the inevitable small variations in the manufacture of barrels and shells of nominally the same type.

Up to now, the common practice for an initial firing has been to set the quadrant elevation (hereinafter simply called elevation) for a gun laying system by referring to "firing tables." Subsequent adjustments for further firings are then made, again with the aid of these tables. The firing tables are produced by calibration firings undertaken for a given barrel type under various conditions. Current calibration practice involves formulation of a Reduced muzzle Velocity (RMV) which is an actual velocity corrected to a nominal standard projectile mass and charge temperature.

However, even if these firing tables are regularly updated based on calibration firings of further barrels manufactured to the same specification, they can never take account of all the variations in muzzle velocity which are encountered with real-life firings, whether arising from known or unknown sources. This conventional practice based on use of firing tables has inherent inaccuracies for reasons which include the following:

a) A single calibration value cannot be applied to all guns of a type. Analysis shows that individual barrels have consistent characteristics which are significant to muzzle velocity prediction but which are unique to the barrel.

b) A single calibration value cannot be applied to a single barrel even for the duration of a series of firings.

c) Significantly, the first few firings of a series show significant variations from the calibrated value.

With reference to FIG. 1 of the accompanying drawings, here it is convenient to define the following expressions pertaining to gun control:

Series. A series of firings is defined to start whenever:
a different propellant charge is used to fire the projectile than the charge used to fire the previous projectile;
gun maintenance of any form has occurred; or
the barrel is "cold," i.e., a significant period has elapsed since the previous firing.

Point of Aim (POA). This is the point where it is desired for the shells to fall. Normally there is a target present at this location.

Mean Point of Impact (MPI). This point is the centroid of the points where the projectiles actually land. It is displaced from the POA because of a number of factors, including differences between the actual muzzle velocity of the projectiles fired and the muzzle velocity used in aiming calculations.

Accuracy. The accuracy is defined as the displacement between the POA and the MPI.

Precision. Precision is defined as the dispersion of shell impact points around the MPI.

It is an object of the present invention to provide increased accuracy, i.e. to decrease the distance between the Point of Aim and the Mean Point of Impact. It is also an object of the invention to improve the Precision such that the dispersion of the shells, around the MPI, is smaller.

SUMMARY OF THE INVENTION

The present invention can achieve this through measuring the muzzle velocity and using the result to aim the gun appropriately. In general, the measured muzzle velocity is used to predict a new muzzle velocity for the next firing and takes this into account in determining the appropriate elevation setting of the next firing. Of particular significance is that modern guns perform a small number of firings in each series. The invention can be particularly effective at improving accuracy in these first few firings.

Thus, in a first aspect, the present invention provides an aiming system for an indirect-fire weapon, the system comprising a muzzle velocity measuring device, and prediction means responsive to an output of the muzzle velocity measuring device for determining a new elevation setting from the weapon. Preferably, the aiming system is integrated with the weapon itself, most preferably directly cooperating with the weapon's gun (barrel) laying system.

The first aspect of the present invention also includes a method of determining an elevation setting for an indirect-fire weapon, the method comprising firing the weapon and measuring the resultant muzzle velocity, and using the result of the measurement to make a prediction and thus determine a new elevation setting for the weapon.

In preferred embodiments of the first aspect of the invention, the predictor means utilizes previous measured muzzle velocities to predict a new muzzle velocity under the conditions for the next firing and uses the predicted muzzle velocity to determine the elevation setting. However, prediction of other parameters useful in determining elevation is also within the ambit of the present invention.

The muzzle velocity measuring device may for example be a Doppler radar device attached to the barrel of the weapon for measuring the velocity of a projectile as it leaves the barrel.

Preferably, an interface is also provided between the predictor means and the gun laying system used for setting the barrel, so that the quadrant elevation can be re-set automatically according to the new muzzle velocity predicted by the predictor means.

Although the predictor may predict a new muzzle velocity based on the measured muzzle velocities from previous firings, it is also responsive to initial values to enable the first firing to be effected with reasonable accuracy.

A convenient way of realizing the predictor means is in the form of an electronic computer programmed in a way to be described in more detail hereinbelow. It is very much preferred for the computer to be electronically connected to the muzzle velocity measuring device, for example via an appropriate interface, to receive output signals from the latter for use in the prediction method. As indicated above, it is also preferred for the computer to be connected directly to the gun laying system via an appropriate interface.

The electronic computer should consist of:
a memory for storing program, parameters and data;
one or more input ports for receiving the necessary inputs; and
one or more output ports for communicating the predicted muzzle velocities to the Gun Laying System and, optionally to a display showing information to an operator.

Some of the memory for storing parameters and data is preferably used to retain information even when the device is switched off. This part of the memory is non-volatile and is implemented as a battery-backed Random Access Memory or as magnetic tape, magnetic disc or optical storage medium et cetera.

Preferably, the prediction means and method utilize an adaptive empirical prediction method (AEPM), that is, a method which is capable of "learning" from a comparison of its prediction and the subsequent real-life result and adapting the way in which it makes the next prediction accordingly.

When applied to the present invention, the AEPM is used to estimate the various effects which influence muzzle velocity, in order to derive an improved RMV for input to the gun laying system. This is achieved by estimating the primary errors present in RMV calculations, i.e., the difference between the nominal (calibrated and corrected) RMV and the true muzzle velocity.

The AEPM combines measurements taken at each firing to estimate the major errors present in the nominal estimate of RMV. The analysis of the available measurements permits the following major errors to be estimated separately. In statistical terms, the following errors are separable:

Barrel Effect. This is a long term effect, particular to an individual barrel, which persists from series to series.

Occasion to Occasion Effect. This effect persists for the duration of an individual firing series.

Within Series Effect. This is a short term effect which is significant only for the early rounds of a series.

Seating Depth Effect. This is an effect due to the variation in muzzle velocity caused by variation in the Seating Depth of a shell (also called ramming depth).

Thus a second aspect of the present invention comprises a device for predicting a future muzzle velocity of an indirect-fire weapon, the device comprising means responsive to a measurement of muzzle velocity and adapted to implement an adaptive empirical prediction method to predict the future muzzle velocity.

The second aspect of the invention also includes a method of predicting a future muzzle velocity of an indirect-fire weapon, the method comprising measuring a muzzle velocity and using an adaptive empirical prediction method to predict the future muzzle velocity.

Most preferably, the device includes means responsive to (means for inputting) relevant environmental, projectile and other calibration data.

In preferred embodiments of the second aspect of the invention, appropriate means utilize future muzzle velocity to determine an elevation setting for the weapon.

Preferably, the AEPM is implemented as a Kalman Filter, most preferably in combination with a first round prediction algorithm (FRPA), or it is implemented as a neural network, which incorporates the FRPA. The FRPA specifically estimates the combination of Barrel Effect and Within Series Effect for the first round of a series.

In a preferred embodiment, the AEPM uses at least the following measurements:

Time. This may be "time now" or time since the last firing of the gun. It is used to estimate "cold barrel" in the absence of barrel temperature and to set up time dependent parameters.

Projectile Mass. This is the mass of the projectile to be fired. The mass of the projectile may be implied from its type (see below) in which case the device is set appropriately to a nominal value before firing commences and the data need not be entered again until projectiles with a different mass are used. It is used to compute the RMV.

Projectile Type. Projectiles of different manufacture or configuration can give rise to quite different muzzle velocities, even for projectiles which have the same mass. The projectile type is input to the device at least whenever the type of projectile being fired is different to the type of projectile previously fired. In particular, each type of projectile may have a different nominal muzzle velocity. It is used in a similar way to charge identifier (see below).

Charge Identifier. The charge identifier is a means of determining how much propellant (and of which type) is being used to fire the projectile from the gun. The charge identifier is input to the device at least whenever the charge is different to the charge previously fired. It is used to identify the start of a series, to select charge dependent parameters within the Kalman Filter and as input to the FRPA. It is also used to calculate RMV.

Previous Charge Temperature. The charge temperature is the temperature of the propellant used to fire the projectile from the gun. The charge temperature is input to the device at least whenever there is a significant change in the temperature of the propellant. Charge temperature is used to calculate the RMV.

Muzzle Velocity, MV. The muzzle velocity is input to the device immediately after each projectile firing. The muzzle velocity is measured and calculated by an external device such as muzzle velocity measuring radar. The difference between previous Muzzle Velocity and the nominal muzzle velocity is used as a measurement of the combined effects defined above.

In addition, the following may optionally also be utilized as variables, to improve overall prediction of muzzle velocity:

Barrel Wear. A measurement of the barrel wear (change in internal diameter) may be input to the device whenever such data becomes available. It is used as a measure of barrel effect.

Shell Seating Depth. The depth of seating of the shell (also called ramming depth) may be input to the device, if such data is available. It is used to remove some of the errors particular to an individual round which are not estimated by the model of Within Series Effect.

Barrel Temperature. The temperature of the barrel may be input to the device, if such data is available. It is used to detect "cold barrel" and as a measurement of the Occasion to Occasion effect.

Propellant Lot Identifier. When the charge system used is such that propellant is delivered in lots or batches, data which identifies individual propellant lots may be input to the device. It is used to indicate when additional variation to muzzle velocity is likely.

Effective Full Charge (EFC) Value. The EFC value for a charge is a measure of its contribution to barrel wear. The EFC value may be input to the device for each charge used. It is used as a measurement of Barrel Effect.

Initialization Parameters. These are used for setting up the Kalman Filter for each gun, each charge and each projectile type to be used. They define the stochastic behavior of the measurements and of the effects. These parameters must be determined for each new situation through a calibration procedure.

The Kalman filter was first developed during the 1960's. A Kalman filter contains a dynamic model of system errors, characterized as a set of first order linear differential equations. Thus, the Kalman filter comprises equations in which the variables (state-variables) correspond to respective error sources and the equations express the dynamic relationship between these error sources. Weighting factors are applied to take account of the relative contributions of the errors.

The weighting factors are optimized at values depending on the calculated simultaneous minimum variance in the distributions of the errors. The filter constantly reassesses the values of the state-variables as it receives new measured values, simultaneously taking all past measurements into account. Therefore, the Kalman filter is able to predict a value of one or more chosen parameters based on a set of state-variables which are updated recursively from the respective inputs.

Whilst it is possible to initialize the prediction by the Kalman filter of the muzzle velocity for a first round, e.g. using firing tables, it is much preferred to use a first round prediction algorithm. The FRPA utilizes a weighted average of previous first round errors for similar charge/projectile combinations.

Instead of the Kalman Filter, the present invention may use a neural network (sometimes abbreviated to neural net), in particular, a recurrent multi-layer neural network. A neural net can be regarded either as a "second order" Kalman Filter or as a separate entity in its own right.

A neural network is essentially an electronic or software equivalent of the network of neurons in the human brain. It consists of "artificial neurons" which receive various inputs and apply weighting factors to each before combining them into a function to produce a required output result. A recurrent multi-layer neural network consists of at least an input layer and an output layer of artificial neurons, separated by hidden layers. The neural network compares errors and uses these to continuously adjust the weighting factors and/or the operative functions to minimize the errors and optimize the result. Therefore, unlike the Kalman Filter, it "decides" for itself which inputs to use and what significance to attach to them and it continuously improves this model based on result. The theory and implementation of neural nets are well documented, for example in *Neural Computing: An Introduction*, R. Beale and T. Jackson, Adam Hilger 1990.

Thus, unlike the Kalman Filter, the neural net does not require initialization. The neural net receives all available inputs and through its internal "learning process" applies appropriate weighting factors so that it takes as much or as little (including zero) account of each to find an optimum estimate of the parameter to be predicted, in the present case muzzle velocity.

If used in the present invention, the neural net self-organizes to represent:

(a) the nature of the errors in the nominal muzzle velocity and their stochastic behavior over time; (b) the relationship between these errors and the measurements identified above; and (c) how the errors influence the prediction of muzzle velocity.

The neural net then computes an estimate of the correction to be applied to the nominal muzzle velocity. Like the Kalman Filter, the neural net continually updates the relative weighting it allocates to each variable, based on a comparison of its prediction of muzzle velocity and the subsequently measured real-time muzzle velocities.

BRIEF DESCRIPTION OF THE DRAWINGS

The present invention will now be explained in more detail by the following description of a preferred embodiment and with reference to the accompanying drawings in which.

DETAILED DESCRIPTION OF ILLUSTRATIVE EMBODIMENTS

Figure 1:
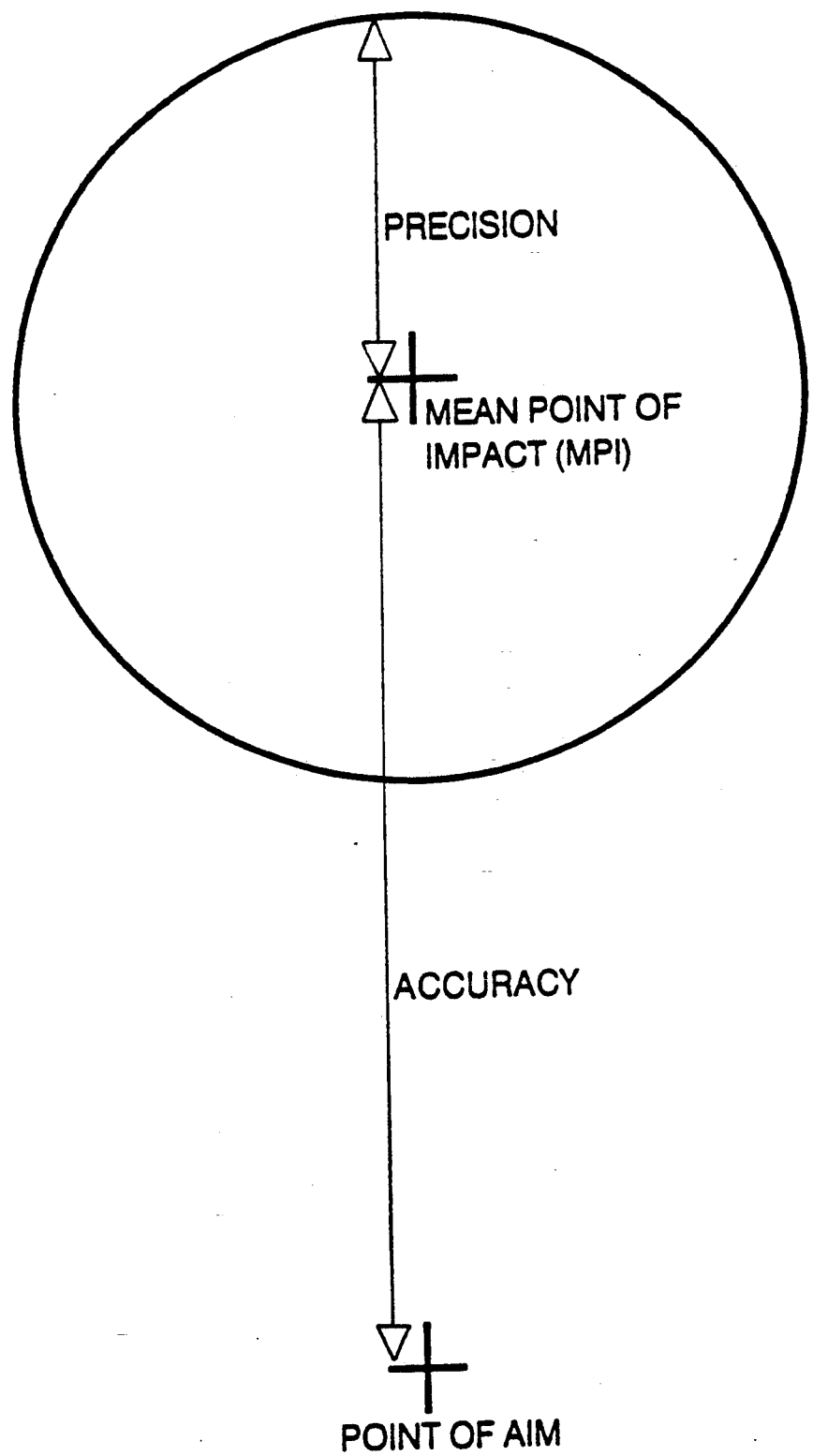
FIG. 1 shows a diagram illustrating expressions pertaining to gun control.
Figure 2:
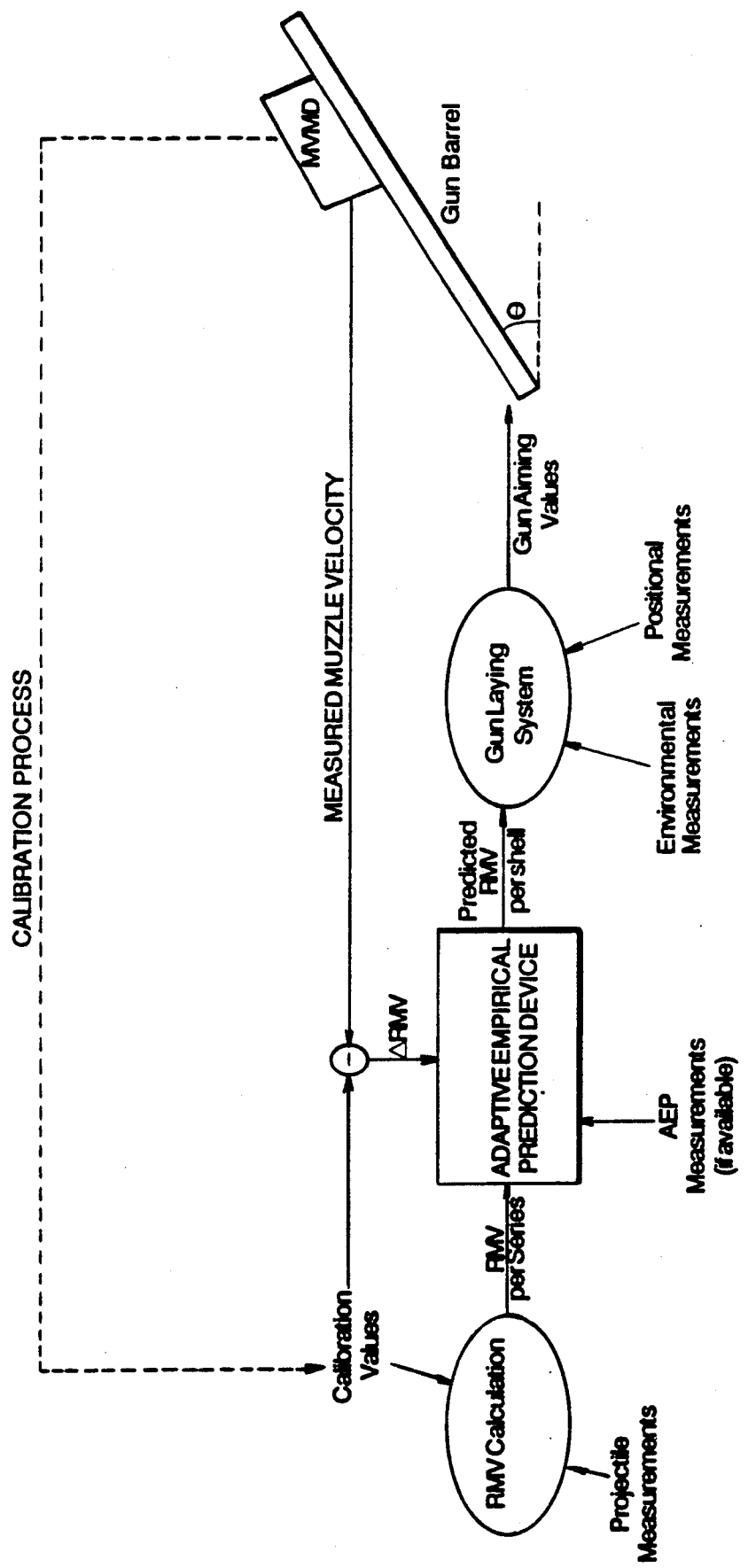
FIG. 2 shows a weapons system according to the present invention.

As shown in FIG. 2, a weapons system 1 comprises a gun barrel 3 on which is mounted a Doppler radar muzzle velocity detection device 5. The elevation $\theta$ of the barrel is set by the gun laying system 7.

Electronic circuitry includes means 9 for making an initial RMV calculation based on initial calibration values and projectile data. An adaptive empirical prediction device 11, also forming part of the circuitry, implements an AEPM. It utilizes the initial RMV value and the measured muzzle velocity to predict the next muzzle velocity. The gun laying system utilizes predicted muzzle velocity, together with environmental and positional information, to perform the ballistics calculations necessary to select the appropriate charge and shell type and determine the appropriate azimuth and elevation for the gun. The improved muzzle velocity prediction supplied by the AEPM permits the gun laying system to determine an improved elevation for the next firing.

The operation of the circuitry is described in detail hereinbelow.

Figure 3:
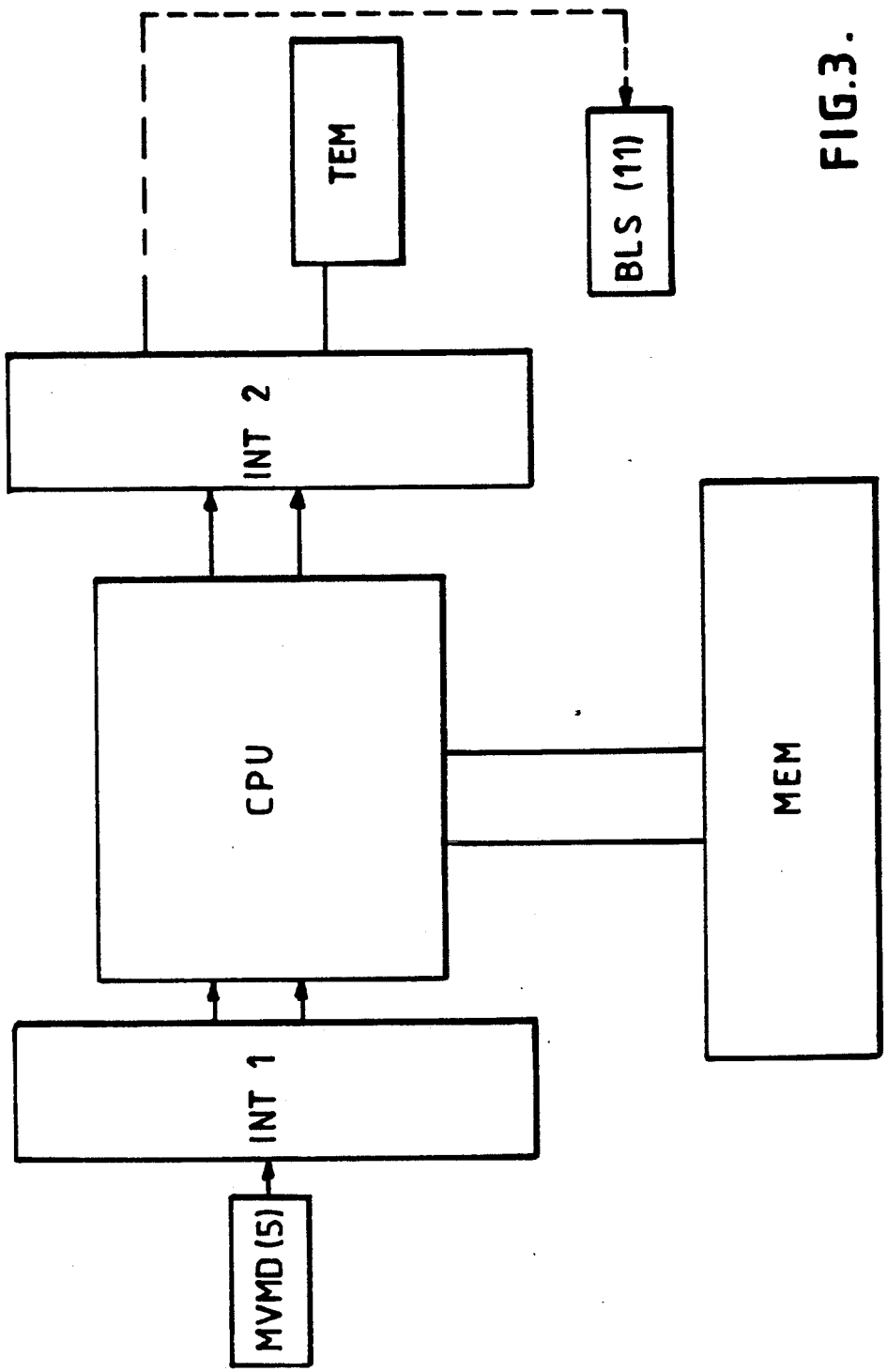
FIG. 3 shows the arrangement of a prediction device of the present invention as utilized in the system shown in FIG. 2.

FIG. 3 shows the configuration of the circuitry which comprises a (microprocessor) processing unit CPU. The CPU is connected to a non-volatile memory MEM for back-up memory storage. The CPU is connected via a first interface INT1 to receive the output of a Doppler radar muzzle velocity measuring device MVMD (5) which in use is attached to a gun barrel to measure the muzzle velocity of shells as they are fired.

The CPU is also connected via second interface INT2 to an interactive display terminal TEM and to an automatic barrel laying system BLS.

The CPU receives values of the available measurements such as projectile mass and type, charge type and temperature, estimated barrel wear, shell seating depth and the like. These may be programmed into the terminal by the operator. The muzzle velocity measurement is provided by the Doppler radar and time is derived from the internal clock of the CPU. Alternatively, measurements of some variables such as barrel temperature may be provided directly to the CPU by appropriate sensors (not shown). Initialization parameters are resident in non-volatile memory together with the Computer program.

The operation of the circuitry in implementing the AEPM will now be described In more detail.

DATA INPUT

Some data values must be input to the device in order for it to perform satisfactorily. Others may be input to the device in situations where measurements of these values are available.

The inputs are categorized as muzzle velocity and AEP measurements, which are state-variable measurements to be incorporated within the AEP device, projectile measurements, which are required for the RMV Calculation, and positional and environmental measurements, which are required for Gun Laying.

AEP MEASUREMENTS

The essential and further optional measurements of the state-variables have been described hereinbefore.

POSITION AND ENVIRONMENTAL MEASUREMENTS

Examples of environmental measurements are air temperature and pressure, and wind speed and direction.

Examples of positional information are target position, gun position and terrain information.

KALMAN FILTER DESCRIPTION

A multi-state Kalman Filter is used to estimate the major sources of error in muzzle velocity prediction, i.e., the difference between nominal Muzzle Velocity and measured muzzle velocity.

The Kalman Filter embodies:

a) a definition of these errors and their stochastic behavior in time;

b) the relationship between these errors and the measurements identified above; and c) how these errors influence the prediction of muzzle velocity.

MODELLING THE BEHAVIOR OF ERROR EFFECTS

The errors modelled are:
Barrel Effect, denoted b(t), (the notation b(t) indicates that the Barrel Effect b is a function of time),
Occasion to Occasion Effect, denoted a(t),
Within Series Effect, denoted w(t),
Seating Depth Effect, denoted d(t).

Barrel Effect is modelled as a time series with a time constant and variation chosen to reflect the persistence of the effect over a number of series. Thus, b(t) is modelled in the form:

$$b(t+z)=e^{-Z/B}b(t)+a_1,$$

where z is the time between firings, B is the (long) time constant reflecting the slow variation of b. The variable $a_1$ represents a white noise process with a specified variance $v_1(z)$; i.e., $v_1$ is a function of z.

Occasion to Occasion Effect is modeled as a time series with a time constant and variation chosen to reflect the persistence of the effect over one series. Thus, s(t) is modelled in the form:

$$s(t+z)=s(t)+a_2,$$

where variable $a_2$ represents a white noise process with a specified variance $v_2(z)$.

Within Series Effect is modelled as a time series with a (short) time constant and variation chosen to reflect the rapid variation over the first few rounds of a series. Thus, w(t) is modelled in the form:

$$w(\text{next round})= W\ w(\text{this round})+a_3,$$

where W is a factor reflecting the variation of w from round to round (note that $0<W<1$). Also, $a_3$ represents a white noise process with a specified variance $v_3(z)$.

Seating Depth Effect attempts to model the correlation between the muzzle velocity an the shell seating depth. The state variable is modelled as a time series with a time constant and variation chosen to reflect the persistence of the effect over more than one series. Thus, d(t) is modelled as a random walk in the form:

$$d(t+z)=d(t)+a_4$$

where $a_4$ represents a white noise process with a specified variance $v_4(z)$. Note that this variable would only be included in the filter if measurements of Seating Depth are available. In practice, the Filter retains one Seating Depth state variable per change type.

All other errors are modelled as uncorrelated white noise, and are effectively incorporated within the $a_j$ terms.

In the notation of Kalman Filter theory referred to above, the variables b, s, w and d are the state-variables. The above formulae represent the state variables in a way which completely defines the Kalman Filter propagation equation.

The state variables are initialized at the beginning of each series. Those variable which are persistent over a single series, i.e., Occasion to Occasion Effects, are initialized to zero. Barrel and Seating Depth Effects are initialized with the estimates derived during the previous series, as described below. Within Series Effects are initialized so that Barrel Effects plus Within series Effects sum to the First Round Prediction, which is also described below.

The initial variances associated with these initialized states are prescribed, for Occasion to Occasion and Within Series Effects, and derived from the previous series, for Barrel and Seating Depth effect.

MEASUREMENTS WITHIN THE KALMAN FILTER

The AEP measurements may be divided into Initialization and Parametric Measurements and described in terms of their relationship to the state variables. This specifies the details necessary to implement the Kalman formulation.

The following initialization measurements indicate when the start of a series occurs, and the Kalman Filter is to be initialized with state estimates derived from the First Round Prediction Algorithm. They have the sig- The next sections describe the method by which input measurements are encoded, how the method is applied to each measurement, how muzzle velocity predictions are derived and which information should be retained to characterize the behavior of the gun.

SPREAD ENCODING

In a neural network the input data must be encoded in an efficient and effective way. In this application, the appropriate mode applied to many of the measurements is called spread encoding. In this case, an input value is encoded on a number of input nodes, m say. This is achieved by dividing the range [a to b], over which the variable is encoded, into $m-1$ parts. Suppose the variable takes the value f, which lies in the range [a to b]. Suppose also that $$i = 1 + \text{integer part of } ((m-1) \times (f-a)/(b-a)).$$

Then all input nodes are set to zero, except nodes i and $i+1$. These nodes take values defined as follows.

Let $$w = (m-1) \times (f-a)/(b-a),$$

and let $$p = w - \text{integer part of } (w).$$

Also, for each $j = 1, 2, \ldots, m$, let $n_j$ denote the value input to node j. Then $n_i$ and $n_{i+1}$ are computed as:

$$n_i = 1 - p,$$

and $$n_{i+1} = p.$$

MEASUREMENTS INPUT TO THE NEURAL NETWORK

The measurements input to the AEP device are those previously described under the heading Data Input. Each measurement is input to its designated input nodes in the way described below.

AEP MEASUREMENTS

Time. Time is input by spread encoding the logarithm of the time since last firing.

Projectile Type. One binary node is associated with each projectile type. The relevant node is set to one, all other projectile type nodes are set to zero.

Change in Projectile Type. One binary input node is associated with each projectile type. The node is set to one for the projectile type of the previous series; otherwise it is set to zero.

Charge Identifier and Change in Charge Identifier. The same approach is applied to Charge Identifier as is applied to Projectile Type.

Barrel Temperature. Barrel temperature is spread encoded.

Change in Propellant Lot Identifier. A single node is associated with change in Propellant Lot. This node is set to one if the lot changes and is zero otherwise.

Barrel Wear and Effective Full Charge (EFC) Values. These values are used in the same way as for the Kalman Filter process, as described above.

Number in Series. The number in series is the number of firings in this series up to and including the next, i.e., the one for which the prediction will apply. This number must be incremented and input to the network. It is input by spread encoding the reciprocal of the number in series.

Reduced Muzzle Velocity. The previous Muzzle Velocity Prediction is spread encoded as input.

MUZZLE VELOCITY MEASUREMENT

Delta Muzzle Velocity. This variable is spread encoded.

Shell Seating Depth. This variable is spread encoded.

MUZZLE VELOCITY PREDICTION

The neural network achieves muzzle velocity prediction by outputting the correction to be applied to the nominal muzzle velocity at each firing.

The network is updated following each firing by performing back propagation. In the back-propagation process, the actual muzzle velocity measurement is spread encoded onto the output nodes, and the procedure modifies the weights to reduce the difference between the predicted and the actual muzzle velocities. The new weights are then applied at the next prediction. Thus the predicted muzzle velocity is generated on the output nodes in a spread encoded form.

RETAINED INFORMATION

A benefit of the AEP is that it can be arranged to retain information about the significant characteristics of the gun between firings. For the Neural Network the statistical behavior of the gun is represented in the weights which are derived in the network. Therefore these weights should be retained between firings, even if the equipment is powered down.

Retention of the weights permits effective First Round Prediction.

FIRST ROUND PREDICTION ALGORITHM (FRPA)

In order to derive the best estimate of muzzle velocity of the first round in a series, the AEP Device maintains a table of First Round Corrections. These corrections are applied to the nominal RMV in order to predict the first round muzzle velocity. The table contains a correction appropriate to: previous charge type/current charge type pairs.

The table is updated as follows.

Suppose the new charge type is denoted by i and the previous charge type is denoted by j. Suppose that the element in the table defining the correction to be applied in this case is denoted $T[i,j]$. Then the predicted muzzle velocity for the first round of the new series (with charge type i) is given by:

First Round Prediction = nominal muzzle velocity + $T[i,j]$.

Suppose then that the difference between the measured muzzle velocity and the nominal muzzle velocity for the first round of the series (with charge type i) was E. Then the table of correction is updated as:

$$T[i,j] = \beta T[i,j] + (1-\beta)E.$$

where $\beta$ is a specified value, between zero and one.

nificance hereinbefore described and are: Time; Change in Projectile Type; Change in Charge Identifier; and Barrel Temperature.

The various parameters in the Kalman filter are dependent upon the firing scenario. The relevant measurements are as follows:

Time. Time since last firing is required to define the parameters $z$, $v_1$, $v_2$, $v_3$ and $v_4$ as hereinbefore defined.

Projectile Type. Each type of projectile requires a different set of time constants B and W, and different variations $v_1$, $v_2$, $v_3$ and $v_4$.

Charge Identifier. As for Projectile Type.

Propellant Lot Identifier. A change in Propellant Lot will be interpreted as a possibility for increased uncertainty in the error effects. Thus, this parameter will affect the choice of variances of $v_1$, $v_2$, $v_3$ and $v_4$ before the next firing.

Barrel Wear. The correct RMV is known to decrease with increased Barrel Wear, and when available, measurements of barrel wear may be used to modify the input RMV in proportion to the measured Barrel Wear.

Effective Full Charge (EFC) Value. When available, measurements of EFC may be used to indicate barrel wear and thereby be used to modify the input RMV.

MUZZLE VELOCITY MEASUREMENT

The following measurements are input to the Kalman Filter as standard measurements. The relationship between each measurement and the state variables is specified, which defines the information necessary to carry out the Kalman Filter measurement update.

Delta Muzzle Velocity. Delta Muzzle Velocity denoted delta RMV, is the computed difference between the Measured Muzzle Velocity, output from the Muzzle Velocity Measuring Device, and the nominal Muzzle Velocity. The relationship between delta RMV and the state variables is assumed to be:

$$\text{delta } RMV = b + (SSD \times s) + w + d + a_5,$$

where the variable $a_5$ represents a white noise process with a specified variance $v_5$. The term including SSD, which denotes the measurement of Shell Seating Depth (as indicated below), is included only if this measurement is available.

Shell Seating Depth. The measurement of depth of the seating of the shell, denoted SSD, may be input to the device if such data is available. The relationship described in the above equation incorporates the state variable s, which estimates the correlation between SSD and RMV.

MUZZLE VELOCITY PREDICTION

When it is time to predict muzzle velocity, the standard Kalman prediction is performed to give estimates of the state variables at a time z in the future, i.e., when the next firing will occur. This is performed using the model specified hereinbefore. Then, using the updated estimates of the state variables, the RMV is predicted as:

$$RMV = \text{nominal } RMV + b + (SSD \times s) + w + d,$$

where the term involving SSD is included only if the measurement of the seating depth of the projectile to be fired is available.

RETAINED INFORMATION

A major benefit of the AEPM is that it can retain information about the significant characteristics of the gun between firings. For the Kalman filter this is achieved by retaining estimates of the state variables which persist longer than a single firing, i.e., Barrel Effect and Seating Depth Effect. At the end of each series, these variables, together with the associated covariances (as computed in the Kalman filter), are stored in non-volatile memory. At the start of a new series, these variables are then restored.

Various initialization parameters must be input to the Kalman filter. These are derived through extensive analysis of data from previous firings. These parameters are constant across all guns of a specific type, but may vary over different gun types. The relevant parameters are:

a) the variances $v_1$, $v_2$, $v_3$, $v_4$ and $v_5$, b) the initial variances of the state variables for each series, and c) the time constants, B and W, of the major errors.

These parameters may need estimating for each new type of gun.

Also these values, together with the First Round Prediction Table and estimates of Barrel and Seating Depth Effects must be retained between firings, even when the equipment is powered down.

NEURAL NETWORK DESCRIPTION

A Recurrent Multi-Layered Neural Network, can also be configured to implement the AEPM and generate corrections to nominal muzzle velocities and to predict muzzle velocities for subsequent rounds.

The benefit of the neural network approach over any other is that it is "self tuning" and does not require the derivation of Initialization Parameters. The neural Network self organizes in the general manner hereinbefore described.

It is normal to train a neural network on selected data. This can be achieved by selecting training data, encoding it into the network, then for each item of training data the desired output is prescribed and the necessary network weights are determined by the method of backpropagation. This method is successful, and equates to the approach prescribed for the Kalman Filter in which certain parameters are determined for a type of gun by performing initial analysis on firings from a single gun.

However, the preferred mechanism offers the benefit that it modifies its weights, by back propagation, at every firing. In this way the neural network further extends the concept of calibration of every gun by removing the need to carry out this initial data analysis. If the AEPM is implemented as a neural network, then the implementation effectively conducts this analysis for each gun. This reduces the effect of variations within guns and simplifies the calibration process.

NETWORK CONFIGURATION

Figure 4:
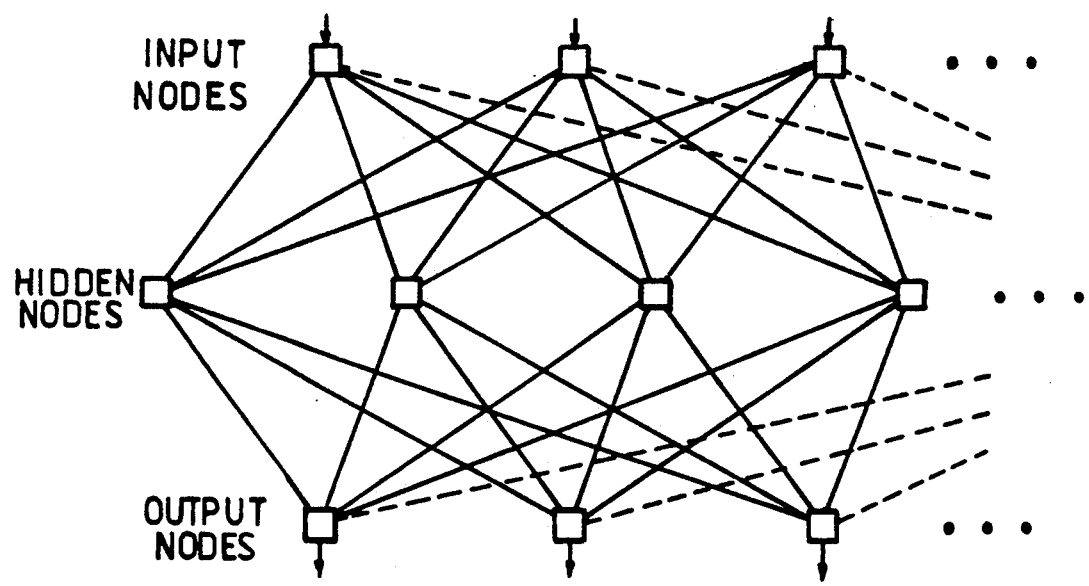
FIG. 4 shows the operation of a neural network for use in the prediction device.

The specific implementation is a multilayered feed forward network, as represented diagrammatically in FIG. 4. All nodes in one layer are connected to all nodes of the next layer. Associated with each link is a weight which is updated, by back propagation, following each measurement of muzzle velocity.

Each input measurement has a set of nodes on which the input values are encoded.

The output of the network is the correction to be applied to the nominal muzzle velocity for the prescribed projectile at the prescribed time.

Then the new value of T[i,j] is applied as a correction to the nominal velocity of first round of the next series where charge type i follows charge type j.

The measurements input to the FRPA are:
Previous First Round Prediction Table
Previous Charge Type,
Current Charge Type,
Measured First Round Muzzle Velocity,
Nominal Muzzle Velocity for the Previous/Current Charge Type pair.

Notes

1. Where the Kalman Filter is present, an enhanced method of updating the First Round Prediction Table is to consider the estimate of the Barrel Effect (b) as an improved estimate (in place of E) of the first round error. In this case, T[i,j] would be updated as:

$$T[i,j] = \beta T[i,j] + (1-\beta)b.$$

2. Where the Neural Network is present, the First Round Prediction function is carried out by the Network.

3. Where certain sequences of charge types occur frequently, the First Round Prediction Table is extended to accumulate averages for sequences of three or four charges in sequence. For example, the element T[i,j,k] in the Table estimates the correction to be applied when charges i, j, k follow in immediate sequence. T[i,j,k] is updated as in the above equation.

We claim:

1. A device for predicting a future muzzle velocity of an indirect-fire weapon, the device comprising:
   A) means for measuring muzzle velocity to produce a velocity output; and
   B) a neural network for implementing an adaptive empirical prediction method to predict the future muzzle velocity in response to the velocity output.

2. A device according to claim 1, further comprising means for utilizing future muzzle velocity to determine an elevation setting for the weapon.

3. A device according to claim 1, further comprising means responsive to relevant environmental, projectile and other calibration data.

4. A device according to claim 1, wherein the neural network is a recurrent multi-layer neural network.

5. A device according to claim 1, wherein the neural network self-organizes to represent:
   A) the nature of the errors in the normal muzzle velocity and their stochastic behavior over time;
   B) the relationship between these errors and the measurements identified above; and
   C) how the errors influence the prediction of muzzle velocity.

6. A device according to claim 5, wherein the neural network computes an estimate of the correction to be applied to the nominal muzzle velocity.

7. A device according to claim 1, wherein the neural network is implemented in combination with a first round prediction algorithm.

8. A method of predicting a future muzzle velocity of an indirect-fire weapon, the method comprising measuring a muzzle velocity and using an adaptive empirical prediction method implemented as a neural network to predict the future muzzle velocity.

9. A method according to claim 8, wherein the neural network is a recurrent multi-layer neural network.

10. A method according to claim 8, wherein the neural network self-organizes to represent:
    A) The nature of the errors in the nominal muzzle velocity and their stochastic behavior over time;
    B) the relationship between these errors and the measurements identified above; and
    C) how the errors influence the prediction of muzzle velocity.

11. A method according to claim 10, wherein the neural network computes an estimate of the correction to be applied to the nominal muzzle velocity.

12. A method according to claim 8, wherein the neural network is implemented in combination with a first round prediction algorithm.

13. An aiming system for an indirect-fire weapon, the system comprising a muzzle velocity measuring device, and predictor means responsive to an output of the muzzle velocity measuring device for determining a new elevation setting for the weapon by implementing an adaptive empirical prediction method as a neural network.

14. An aiming system according to claim 13, further comprising means responsive to relevant environmental, projectile and other calibration data.

15. An aiming system according to claim 13, wherein the neural network is a recurrent multi-layer neural network.

16. An aiming system according to claim 13, wherein the neural network self-organizes to represent:
    A) the nature of the errors in the nominal muzzle velocity and their stochastic behavior over time;
    B) the relationship between these errors and the measurements identified above; and
    C) how the errors influence the prediction of muzzle velocity.

17. An aiming system according to claim 16, wherein the neural network computes an estimate of the correction to be applied to the nominal muzzle velocity.

18. An aiming system according to claim 13, which aiming system is integrated with a weapon.

19. An aiming system according to claim 18, arranged to cooperate directly with a gun laying system of the weapon.

20. An aiming system according to claim 19, wherein the predicator means utilizes previous measured muzzle velocities to predict new muzzle velocity under the conditions for the next firing and also uses the predicted muzzle velocity to determine the elevation setting.

21. An aiming system according to claim 13, wherein the muzzle velocity measuring device is a Doppler radar device attached to the barrel of the weapon for measuring the velocity of a projectile as it leaves the barrel.

22. An aiming system according to claim 13, wherein an interface is also provided between the predictor means and the gun laying system used for setting the barrel, so that the quadrant elevation can be re-set automatically according to the new muzzle velocity predicted by the predictor means.

23. An aiming system according to claim 13, wherein the predictor means is responsive to initial values to enable the first firing to be effected.

24. An aiming system according to claim 13, wherein the predictor means comprises an electronic computer comprising:
    A) a memory for storing program, parameters and data;

B) one or more input ports for receiving the necessary inputs; and

C) one or more output ports for communicating the predicted muzzle velocities to a gun laying system.

25. An aiming system according to claim 13, wherein the neural network is implemented in combination with a first round prediction algorithm.

26. A method of determining an elevation setting for an indirect-fire weapon, the method comprising firing the weapon and measuring the resultant muzzle velocity, and using the result of the measurement to make a prediction by using an adaptive empirical prediction method implemented as a neural network and thus determine a new elevation setting for the weapon.

27. A method according to claim 26, wherein the neural network is a recurrent multi-layer neural network.

28. A method according to claim 26, wherein the neural network self-organizes to represent:
A) the nature of the errors in the nominal muzzle velocity and their stochastic behavior over time;
B) the relationship between these errors and the measurements identified above; and
C) how the errors influence the prediction of muzzle velocity.

29. A method according to claim 28, wherein the neural network computes an estimate of the correction to be applied to the nominal muzzle velocity.

30. A method according to claim 26, wherein the neural network is implemented in combination with a first round prediction algorithm.

* * * * *